United States Patent
Myers et al.

(10) Patent No.: US 12,206,799 B2
(45) Date of Patent: Jan. 21, 2025

(54) SECURE ACCESSORY CONNECTIONS

(71) Applicant: Apple Inc., Cupertino, CA (US)

(72) Inventors: Steven A. Myers, San Jose, CA (US); Kyle C. Brogle, San Francisco, CA (US); Sean P. Devlin, San Francisco, CA (US); Edwin W. Foo, Sunnyvale, CA (US); John T. Perry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 308 days.

(21) Appl. No.: 17/805,335

(22) Filed: Jun. 3, 2022

(65) Prior Publication Data

US 2022/0393885 A1    Dec. 8, 2022

Related U.S. Application Data

(60) Provisional application No. 63/197,251, filed on Jun. 4, 2021.

(51) Int. Cl.
*H04L 9/32* (2006.01)
*H04L 9/08* (2006.01)
*H04L 9/40* (2022.01)

(52) U.S. Cl.
CPC .......... *H04L 9/3268* (2013.01); *H04L 9/0825* (2013.01); *H04L 9/3273* (2013.01); *H04L 63/0435* (2013.01)

(58) Field of Classification Search
CPC . H04L 9/3268; H04L 9/3273; H04L 63/0435; H04L 63/0823; H04L 9/3247; H04L 9/3263; G06Q 20/3829; G06Q 20/38215; G06Q 20/4012; G06F 21/33; H04W 12/08; H04W 12/068; H04W 12/069; H04W 12/06

See application file for complete search history.

(56) References Cited

U.S. PATENT DOCUMENTS

| 8,775,757 B2 | 7/2014 | Polzin et al. |
| 8,832,465 B2 | 9/2014 | Gulati et al. |
| 8,873,747 B2 | 10/2014 | Polzin et al. |

(Continued)

OTHER PUBLICATIONS

OS Security Guide—White Paper, Apple Inc., Jan. 2018, pp. 1-82.

*Primary Examiner* — Techane Gergiso
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to securely authenticating communicating devices. In various embodiments, a computing device receives, via a network connection with a network, a first certificate for a first public key pair of the computing device. The computing device provides the first certificate to an offline accessory device and receives a second certificate for a second public key pair maintained by the offline accessory device. The computing device performs a verification of the second certificate and, responsive to the verification being successful, interacts with the offline accessory device. In some embodiments, prior to providing the first certificate, the computing device determines an ordering in which the first and second certificates are to be exchanged by the first computing device and the offline accessory device, and the first certificate is provided to the offline accessory device in accordance with the determined ordering.

18 Claims, 9 Drawing Sheets

(56) References Cited

U.S. PATENT DOCUMENTS

| | | |
|---|---|---|
| 9,043,632 B2 | 5/2015 | Machnicki et al. |
| 9,047,471 B2 | 6/2015 | Polzin et al. |
| 9,547,778 B1 | 1/2017 | Paaske et al. |
| 10,079,677 B2 | 9/2018 | Benson et al. |
| 10,423,804 B2 | 9/2019 | Benson et al. |
| 10,452,859 B2 | 10/2019 | Tamura et al. |
| 10,536,271 B1 | 1/2020 | Mensch et al. |
| 11,082,430 B1* | 8/2021 | Kuo ..................... H04L 63/20 |
| 2011/0252234 A1 | 10/2011 | De Atley et al. |
| 2013/0198284 A1* | 8/2013 | Karri ................ H04L 67/535 |
| | | 709/204 |
| 2015/0339664 A1* | 11/2015 | Wong ............... H04L 63/0823 |
| | | 705/71 |
| 2016/0071081 A1* | 3/2016 | Zheng ............... H04L 9/3247 |
| | | 705/72 |
| 2016/0371716 A1* | 12/2016 | Aitenbichler ........ G06Q 20/387 |
| 2018/0349608 A1 | 12/2018 | de Cesare et al. |
| 2019/0122202 A1* | 4/2019 | Sun ................... G06Q 20/3274 |
| 2019/0132134 A1* | 5/2019 | Noe ...................... H04W 12/08 |
| 2021/0044976 A1* | 2/2021 | Avetisov ............... G06F 21/64 |
| 2021/0399566 A1* | 12/2021 | Visvesha ............. H04L 9/3265 |
| 2022/0247576 A1* | 8/2022 | Beekman ............. H04L 9/3263 |

\* cited by examiner

SECURE ACCESSORY CONNECTIONS

The present application claims priority to U.S. Prov. Appl. No. 63/197,251, filed Jun. 4, 2021, which is incorporated by reference herein in its entirety.

TECHNICAL FIELD

This disclosure relates generally to computing devices, and, more specifically, to securely authenticating communicating devices.

BACKGROUND

Computing devices, such as phones, tablets, laptops, etc., may interface with various accessory devices to enable various functionality. These accessory devices may include, for example, wireless keyboards, mice, controllers, network interfaces, displays, speakers, printers, charging adapters, etc. The disclosure herein provides improved systems and methods for interaction with various accessory devices.

DETAILED DESCRIPTION

Figure 1A:
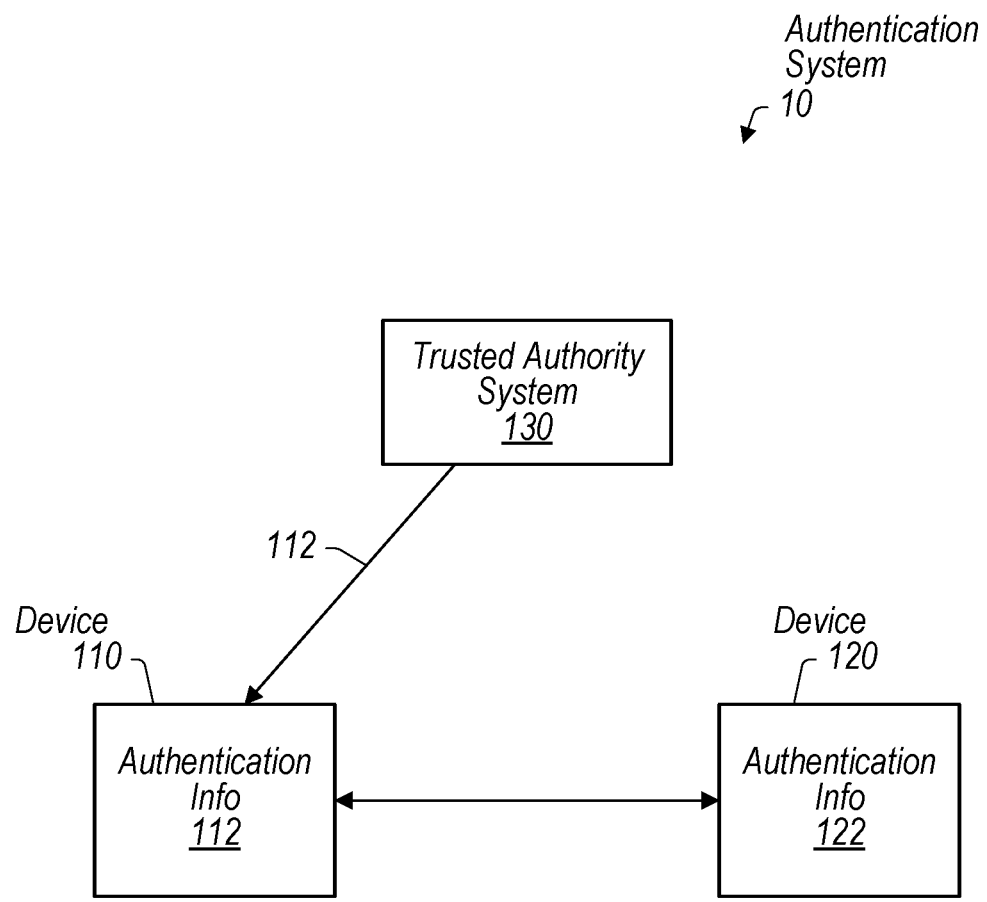
FIGS. 1A and 1B are block diagrams illustrating example systems, in accordance with some embodiments.

In some instances, it may be beneficial for one or both of a computing device and an accessory device to authenticate the other. Such an authentication may be performed to ensure that an unknown device can be trusted (e.g., to operate in a compliant manner, operate in a safe manner, protect sensitive data, etc.). For example, authentication can be performed to establish compatibility and/or security. For example, a computing device may authenticate a printer to ensure it is using the correct driver and/or can receive a print job securely. An authentication may also be performed to ensure that one device does not harm the other. For example, a computing device may authenticate a charging accessory to ensure that the accessory can provide the correct voltage and amperage. An authentication may also be performed to ensure that a connected accessory is not malicious such as an accessory device masquerading as a legitimate device when it is attempting to inject malicious software.

When computing devices and accessory devices authenticate one another, they may reveal sensitive authentication information (e.g., identification information), which could be used to track the devices or their corresponding users. For example, a coffee shop might provide wireless charging pads to its patrons but then use the charging pads to collect authentication information from user devices in order to track visiting patrons. Even if the authentication information itself is anonymous, if the authentication information is unique to a particular user, then the subsequent detection of the authentication information by the authenticating device can inform the authenticating device that a particular user has returned. All that is needed is a link between the authentication information and the user to discover a history of the user's usage of the charging pad, and presence at the corresponding location. Accordingly, it may be beneficial to perform authentication in a manner that limits the ability of a computing device or user to be tracked.

As one approach to addressing the problem of tracking devices and/or users by using authentication information, a computing device can attempt to alter its authentication information (e.g., identity) over time, such as an employing a changing media access control (MAC) address, or by employing any other suitable means. This approach, however, may inhibit the ability to perform mutual authentication. It is also a luxury that may not be available to all devices as some accessory devices may have limited compute, network accessibility, or power constraints that make this option untenable.

The present disclosure describes embodiments in which an authentication exchange is performed that takes device privacy into consideration. As will be discussed below, participating devices can perform an authentication exchange in which participants reveal their authentication information (e.g., identities) in an ordering that takes into consideration the sensitivities of their authentication information. These sensitivities may vary based on multiple factors such as whether a device can alter its authentication information, whether a device travels with a person as they move from one place to the next, whether a device is potentially shared by multiple people and not bound to a single person, etc. In various embodiments, devices with lesser sensitive authentication information can reveal their authentication information first. For example, if a computing device is using a certificate as authentication information to authenticate itself and can contact a certificate authority to subsequently replace this certificate, the computing device may present its certificate first in an authentication with an accessory device that lacks this ability. The accessory device can then verify this certificate and, based on this verification, determine whether to go forward with presenting its certificate to the computing device. If the verification is successful, the accessory device can provide its certificate to the computing device. If, however, the verification fails, the accessory device can determine to not provide its certificate to the computing device. In some embodiments, prior to exchanging authentication information, participating devices may negotiate with one another to determine an ordering in which authentication information should be provided. Once authentication information has been exchanged and the mutual authentication is determined to be successful, a computing device and accessory device can proceed to interact with one another, which, in some embodiments, may further include establishing an encrypted communication session to further preserve privacy.

By taking identity sensitivities into consideration, both sides can be afforded some level of privacy protection in order to reduce the chances of being tracked. Continuing with the above example, the computing device can subsequently discontinue using its previous authentication information and begin using new authentication information to avoid tracking. If the verification of the computing device's authentication information fails, the accessory device can avoid revealing its identity at all.

In some embodiments, a system (e.g., the system 10 shown in FIG. 1A) includes one or more of an electronic device (e.g., 110, 120) and a trusted authority system (e.g., 130). However, the system can include any suitable components. In some embodiments, the trusted authority system 130 is a system of a trusted certificate authority (CA). However, the trusted authority system 130 can be any suitable trusted system that functions to manage authentication information used for authentication. In some embodiments, the devices 110 and 120 can be any suitable type of electronic device. In some embodiments, devices include one or more of computing devices and accessory devices that function to interact with computing devices. Example accessory devices include: accessory devices (on-line accessory devices) that can interact with other devices or systems (e.g., trusted authority system 130) via a network; and accessory devices (offline accessory devices) that cannot interact with other devices and systems (e.g., trusted authority system 130) via a network.

Figure 1B:
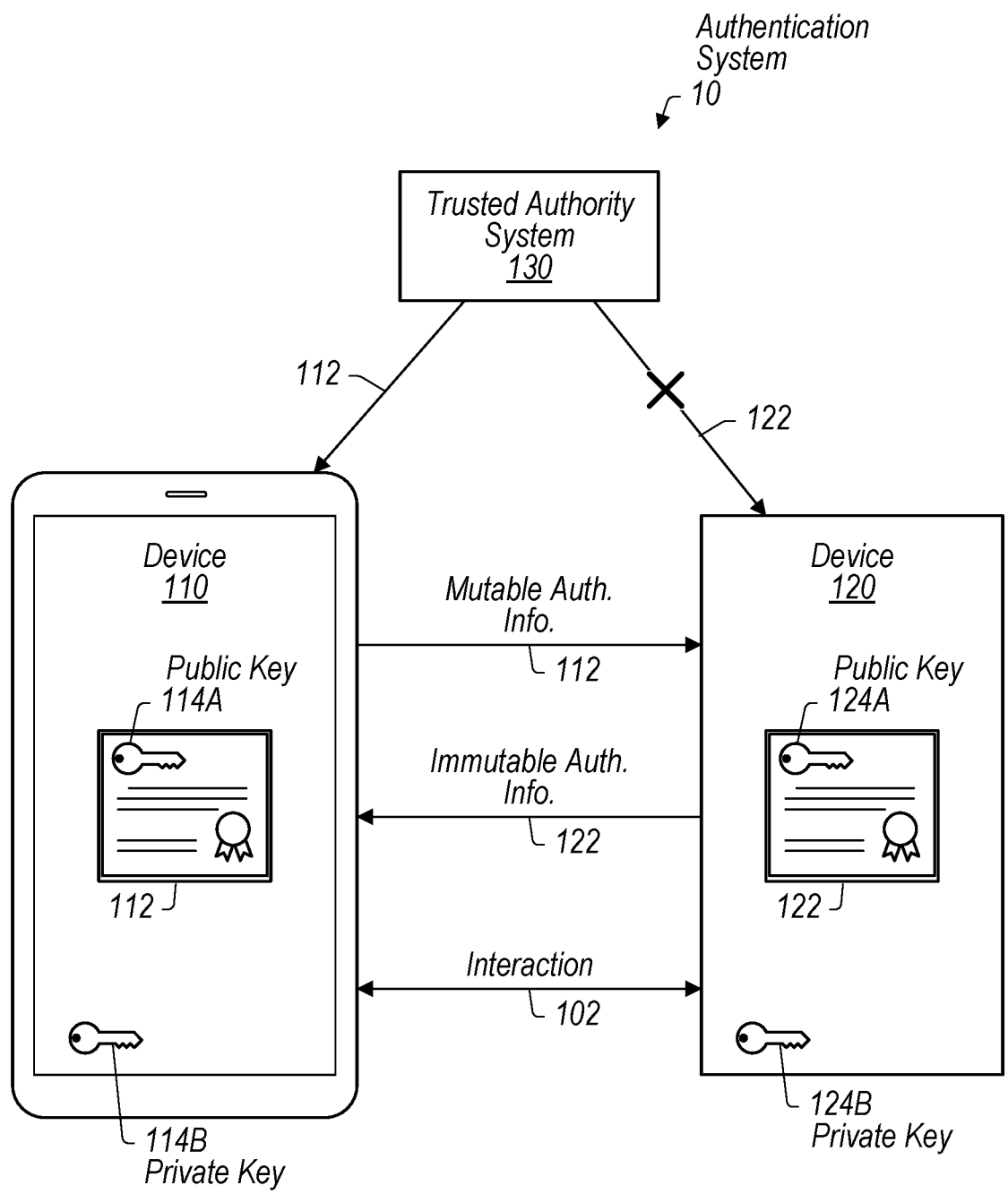

At least two devices device (e.g., 110, 120 shown in FIGS. 1A and 1B) include authentication information (e.g., 112, 122 shown in FIG. 1B). In some implementations, the authentication information (e.g., 112, 122 shown in FIG. 1B) is an authentication certificate for a public key pair with a public key and private key. As shown in FIG. 1B, the authentication information 112 is an authentication certificate for a public key pair with a public key 114A and private key 114B (referred to collectively as pair 114). Similarly, the authentication information 122 is an authentication certificate 122 for a public key pair with a public key 124A and private key 124B (referred to collectively as pair 124). In some embodiments, system 10 may be implemented differently than shown. For example, system 10 may include more than one device 110, 120, more than one trusted authority system 130 may be used, etc.

Device 110, in various embodiments, is a device configured to interact with one or more other devices such as devices 120. Device 110 may be a phone, tablet, laptop computer, desktop computer, wearable device, internet of things (IoT) device, or any other suitable device such as those listed below with respect to FIG. 6. Device 110 may also interface with another device 120 (e.g., an accessory device) using any suitable protocol including wired protocols (such as universal serial bus (USB), Ethernet, Thunderbolt™, etc.) and wireless protocols (such as Wi-Fi®, Bluetooth®, near-field communication (NFC), Zigbee®, etc.). Prior to interacting with device 120, device 110 may authenticate itself to device 120 by presenting authentication information (e.g., an identity) to the device 120. In the illustrated embodiment of FIG. 1B, this authentication information 112 is a certificate for a public key pair 114 generated by computing device 110. As will be described in greater detail below with FIGS. 2A and B, device 110 may receive its authentication information 112 from a trusted authority system 130 trusted by both device 110 and device 120 and attesting to the association of the key pair 114 with device 110. As shown, authentication information 112 includes the public key 114A of the public key 114A while device 110 separately maintains the corresponding private key 114B. In the illustrated embodiment, device 110 is able to communicate with the trusted authority system 130 via a network accessible using a network connection of device 110, which can allow device 110 to request new authentication information 112 from the trusted authority system 130. Trusted authority system 130 may be described as being "trusted" by both devices 110 and 120 as they may be provisioned with the public key of trusted authority system 130 beforehand (such as at fabrication in some embodiments), which can be used to verify authentication information (e.g., certificates) generated by trusted authority system 130 as will be discussed. As noted above, in various embodiments, device 110 can attempt to protect its authentication information by periodically replacing its authentication information 112 with a new one. In some implementations, the authentication information 112 is a mutual authentication certificate 112.

In some embodiments, device 120 is an accessory device that can interact with device 110. In some embodiments, the accessory device 120 is an off-line accessory device. In various embodiments, device 120 is configured to provide some service to device 110. In some embodiments, this service includes providing a user interface as device 120 may be a keyboard, mouse, joystick, stylus, microphone, camera, display, printer, speakers, headphones, etc. In some embodiments, this service includes providing storage as device 120 may be an external solid-state drive (SSD), memory card, etc. In some embodiments, this service includes providing power as device 120 may be a USB power adapter, a Qi-complaint wireless charger, a battery pack, etc. Prior to interacting with device 110, device 120 may also authenticate itself to device 110 by presenting authentication information 122 to the device 110. In some embodiments, this authentication information 122 is a certificate for a public key pair generated by device 120. In some embodiments, in contrast to device 110, device 120 may initially be provisioned with authentication information 122 issued by trusted authority system 130 but may be unable to communicate with trusted authority system 130 after provisioning. For example, in some embodiments, device 120 is provisioned with authentication information 122 at fabrication, but device 120 may lack a network interface capable of communicating with trusted authority system 130 after device 120 leaves the factory. Thus, in FIG. 1B, device 120 is shown as an offline device 120 unable to receive authentication information 122. In some implementations, authentication information 122 is immutable. As a result, the authentication information 122 of offline device 120 may be more sensitive than the authentication information 112 of device 110 as, in some embodiments, the authentication information 122 of device 120 cannot be changed (or is, at least, more difficult to change than the authentication information 112 of device 110).

In various embodiments, however, devices 110 and 120 may employ an authentication exchange that is privacy friendly as it takes these sensitivities into consideration. As will be discussed, devices 110 and 120 may exchange authentication information 112 and 122 in an ordering of increasing authentication information sensitivity. Accordingly, the device 110 or 120 with the lesser sensitive authentication information may go first followed by the device 110 or 120 with the more sensitive authentication information. In some embodiments, devices deemed to have a lesser sensitive authentication information include devices 110 and 120 that are not bound to a particular user—and are potentially shared by multiple users. For example, an authentication information of a wireless charging pad available to anyone at a coffee shop may not be sensitive at all as knowing it may provide little value to someone trying to track particular people. A device 110 or 120 having a fixed location, such as large display or printer, may also be deemed to have a lesser sensitive authentication information as its authentication information may provide little value to someone trying to track a particular user's movement. As discussed above, devices 110 or 120 that can change their authentication information may have less-sensitive authentication information. Accordingly, in the example depicted in FIG. 1B, device 110 sends its authentication information 112) first as it is a less sensitive authentication information than authentication information 122. In various embodiments, if a device 110 or 120 is not the initial device to send authentication information, it can determine whether it wants to reveal its authentication information based on a verification of any previous received authentication information. Continuing with the example depicted in FIG. 1B, device 120 may perform a verification of authentication information 112 in response to receiving it. If the verification is successful, device 120 may reveal its authentication information by providing authentication information 122 to device 110. If the verification is unsuccessful (indicating that something may be amiss), device 120 can withhold its authentication information 122.

Before authentication information 112 and 122 are exchanged, devices 110 and 120 may determine an ordering in which authentication information 112 and 122 should be exchanged. In some embodiments, this may be a static determination made prior to devices 110 and 120 ever detecting one another. For example, device 120 may be configured to never present its authentication information 122 without first receiving and verifying the other participants authentication information 112; device 110 may be configured to always go first as it can change its authentication information 112. As will be discussed below with FIGS. 2A and 2B, in some embodiments, devices 110 and 120 negotiate with one another to determine the ordering in which authentication information 112 and 122 are to be exchanged.

Once authentication information 112 and 122 have been exchanged, devices 110 and 120 may use authentication information 112 and 122 to perform a mutual authentication of one another, which may include verifying authentication information 112 and 122 and using respective public key pairs (e.g., key pairs corresponding to public keys 114A and 124B shown in FIG. 1B). In response to the mutual authentication being successful, devices 110 and 120 may enable further interaction 102 with one another. In some embodiment, this interaction 102 includes devices 110 and 120 establishing a shared cryptographic key based on public key pairs 114 and 124 and encrypting subsequent communications of interaction 102 using the shared cryptographic key. For example, if device 120 is a storage device, device 110 may send encrypted read and write requests to device 120. In other embodiments, however, interaction 102 may proceed in an unencrypted manner. For example, if device 120 is a wireless charging pad, accessory device 120 may merely begin supplying power to charge computing device 110. As will be discussed with FIG. 3, authentication information 112 and 122 may be cached to help expedite subsequent authentication exchanges and reduce the amount of communicated information. As will be discussed with FIG. 4, additional authentication exchanges may be performed between three or more devices 110 or 120 working together.

By taking sensitivities of device 110's and 120's authentication information into consideration, in various embodiments, the authentication exchanged performed by devices 110 and 120 can afford both sides some level of privacy protection with respect to authentication information 112 and 122 as device 110 may replace its authentication information 112 and device 120 may choose to withhold its authentication information 122 in order to reduce the chances of being tracked. More details about an example exchange between device 110 and device 120 will now be discussed.

Figure 2A:
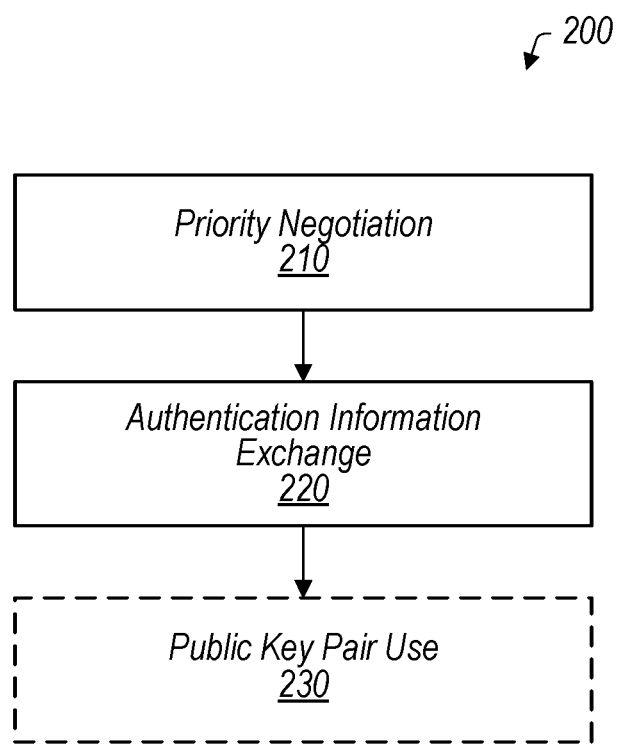
FIGS. 2A and B are block diagrams illustrating example methods, in accordance with some embodiments.

Turning now to FIG. 2A, a block diagram of an authentication exchange method 200 is depicted. In the illustrated embodiment, method 200 includes a priority negotiation 210 and authentication information exchange 220. In some implementations, the method includes a public key pair use 230. In some embodiments, method 200 may be implemented differently than shown such as omitting negotiating 210, using cached authentication information from a previous exchange (as will be discussed with FIG. 3), etc. In some embodiments, prior to performance of method 200, device 110 may interact with trusted authority system 130 to obtain authentication information 112 for use in the method 200.

Figure 2B:
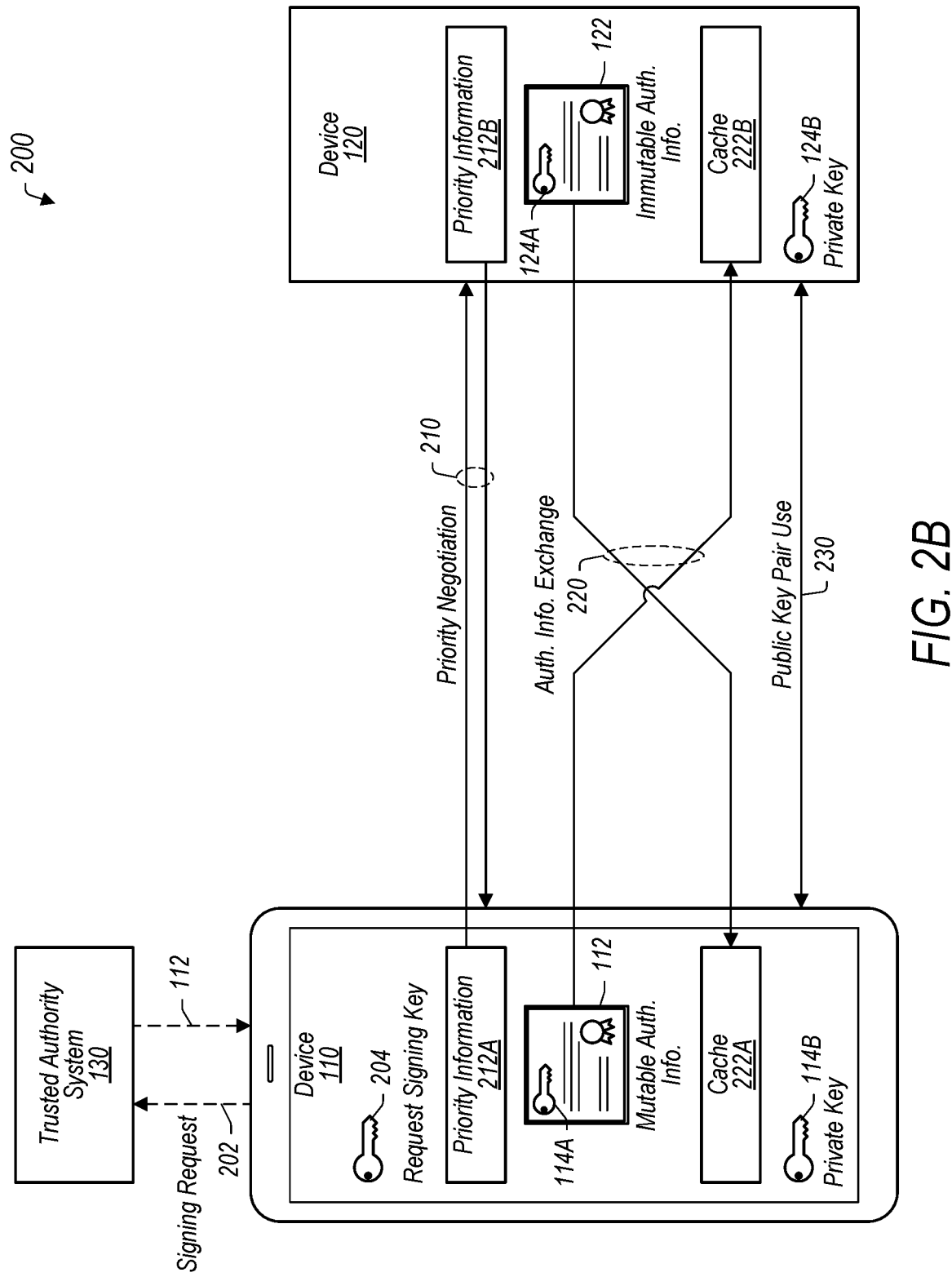

In the illustrated embodiment shown in FIG. 2B, device 110 obtains new replacement authentication information 112 from trusted authority system 130 by issuing an authentication information signing request 202 for a newly generated public key pair 114. Device 110 may use any suitable criteria for determining when to replace its authentication information such as at the start of each instance of the method 200, each time a new device 120 is encountered, at some predetermined interval, etc. In some embodiments, device 110 may obtain a set of multiple authentication information 112 at a given time, so that device 110 can begin using a new one when, for example, device 110 is unable communicate with system 130. In order to attest to the validity of a newly generated key pair 114, in various embodiments, device 110 includes the new public key 114A in the signing request 202 and signs request 202 with a request signing key 204 included in device 110. In some embodiments, request 202 is a certificate signing request (CSR). Request signing key 204 may be a private key corresponding to a public key known to system 130 to be associated with device 110. For example, device 110 may be provisioned at fabrication with request signing key 204, which, in some embodiments, may be shared across a generation of devices 110 belonging to the same device type. In response to device 110 issuing signing request 202 to system 130, system 130 may verify request 202 using the signature generated using request signing key 204 over request 202's contents, including public key 114A. If the verification is successful, system 130 may certify the new replacement public key pair 114 by issuing replacement authentication information 112 to device 110. In some embodiments, authentication information 112 and 122 issued by system 130 may certificates, which may comply with the x.509 standard; however, other suitable formats may be used in other embodiments. After receiving a new authentication information 112, device 110 may store the authentication information 112 in anticipation of performing an instance of method 200.

Priority negotiation 210 may be performed prior to authentication information exchange 220 in order to determine the ordering in which authentication information 112 and 122 should be sent. In the illustrated embodiment, priority negotiation 210 includes device 110 sending priority information 212A to device 120 and accessory device 120 sending priority information 212B to device 110. In various embodiments, priority information 212 may include information indicative of the underlying sensitivities of device 110's and 120's authentication information—and thus information indicative of an ordering in which authentication information 112 and 122 should be exchanged. For example, in some embodiments, priority information 212A indicates an ability of device 110 to interface with system 130 to replace authentication information 112; however, priority information 212B indicates an inability of device 120 to interface with system 130 to replace authentication information 122. In other embodiments, priority information 212 may indicate authentication information sensitivities differently. In some embodiments, priority information 212 is signed by a trusted authority, which could be the system 130, in order to attest to the validity of priority information 212. In some embodiments, this signed priority information 212 may further be associated with another key pair (not shown), which may be shared by multiple devices 110 or 120 in order to prevent the key pair from being uniquely associated to any one device 110 or 120. Once an ordering has been determined, devices 110 and 120 may perform authentication information exchange 220.

Authentication information exchange 220, in various embodiments, includes computing device 110 and device 120 exchanging authentication information 112 and 122 in accordance with the ordering agreed upon in negotiation 210. Accordingly, in the illustrated embodiment, device 110 may initially send its authentication information 112 as device 110's identity may be less sensitive. Device 120 may then send its authentication information 122 as device 120's authentication information may be more sensitive. As authentication information 112 and 122 are received, devices 110 and 120 may verify them in order to ensure they are valid. In various embodiments, this verification includes a device 110 or 120 verifying the included signature generated by system 130's private key against the contents of the authentication information 112 or 122 using system 130's public key, which may be stored in devices 110 and 120 beforehand. In some embodiments, the verification of a received authentication information 112 or 122 may also include performing a portion of public key pair use 230 discussed below. As noted above, if accessory device 120 is unable to successfully verify authentication information 112 received from device 110, device 120 may determine to keep its authentication information private by not sending its authentication information 122 and breaking off communications with device 110. If device 110 determines that authentication information 122 received from accessory device 120 is invalid, device 110 may break off communications and, in some embodiments, contact system 130 to replace its authentication information 112. In some embodiments, if the verifications of authentication information 112 and 122 are successful, devices 110 and 120 may store them in respective authentication information caches 222A and 222B.

Authentication information caches 222A and 222B, in various embodiments, store previously received and verified authentication information 112 and 122, so that they can be reused in subsequent authentication exchanges during performance of the method 200. In doing so, devices 110 and 120 can reduce the amount of traffic communicated in an authentication exchange and can save time by not having to resend and reverify authentication information 112 and 122. In some instances, however, this time savings may allow for a timing attack to be employed in which a third party is able to determine that devices 110 and 120 previously participated in an authentication exchange by detecting that the authentication exchange occurred more quickly than an exchange that did not leverage caching. In order to reduce the effectiveness of this type of attack, devices 110 and 120 may use one or more mitigation techniques as will be discussed below with respect to FIG. 3. Once authentication information 112 and 122 have been exchanged (or determined to already be stored in caches 222), devices 110 and 120 may proceed with performing a public key pair use 230.

Public key pair use 230, in the various embodiments, is performed to confirm that the presenter of authentication information 112 or authentication information 122 is also a possessor of the corresponding private key 114B or 124B (as opposed to some device presenting another device's information). In some embodiments, use 230 may include a challenge response exchange in which a recipient of authentication information 112 or 122 presents a challenge to a sender, which then signs the challenge using the corresponding private key 114B or 124B. In some embodiments, this signature may be generated using digital signature algorithm (DSA) or elliptic curve DSA (ECDSA). The recipient may then verify the resultant signature of the challenge using the public key 114A or 124B included in the received authentication information 112 or 122. In order to mutually authenticate one another, devices 110 and 120 may both send challenges and corresponding responses in both directions to one another. In some embodiments, use 230 includes establishing a shared cryptographic key used to subsequently encrypt communications such as using Elliptic-curve Diffie-Hellman (ECDH) to establish an advanced encryption standard (AES) key. In some embodiments, use 230 includes a combination of a signature exchange and a key exchange such as preformed in a sign and message authentication code (SIGMA) exchange, which may be supported by devices 110 and 120 in one embodiment.

In some embodiments, method 200 is performed by software and/or hardware that implements the physical layer and data link layer of the network protocol used by devices 110 and 120 to communicate. In other embodiments, method 200 is implemented by software at the application layer of the network stack as protocols, such as NFC, may not provide cryptographic support at lower network stack layers. In still other embodiments, combinations of layers in the network stack, which may be implemented in accordance with the open systems interconnection (OSI) model, may be used to implement method 200.

Figure 3:
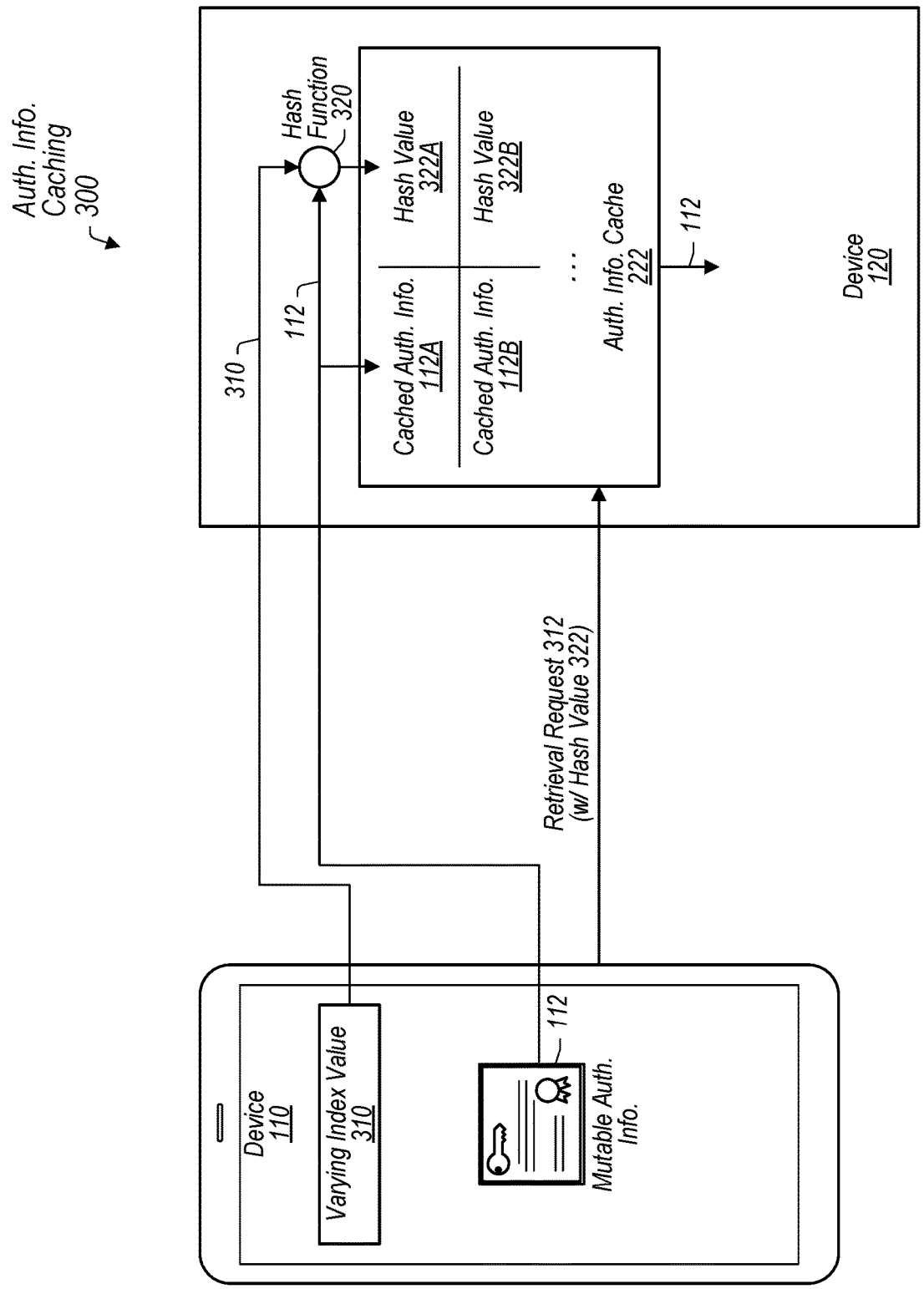
FIG. 3 is a block diagram illustrating an example of certificate caching, in accordance with some embodiments.

Turning now to FIG. 3, a block diagram of authentication information caching 300 is depicted. As noted above, in some embodiments, devices 110 and 120 implement authentication information caches 222 to save the time spent exchanging and verifying authentication information 112 and 122; however, these time savings may enable a timing attack to discern a previous interaction between devices 110 and 120. In the illustrated embodiment, computing device 110 implements a rotating index value 310 with respect to accessory device 120 to reduce the effectiveness of this type of attack. Although not shown, accessory device 120 may implement a similar rotating index value 310 with respect to computing device 110.

Rotating index value 310, in various embodiments, is a value that is used to look up a previous cached authentication information 112 but can be rotated/changed in order to discontinue subsequent lookups. As shown, device 110 may provide index value 310 when it provides its authentication information 122 during an authentication information exchange 220. After a successful verification of the authentication information 112, device 120 may store the authentication information 112 in cache 222 along with a hash value 322 generated by applying a hash function 320 to the concatenation of the index value 310 and the authentication information 112 in some embodiments. This hash value 322 may obfuscate the original index value 310 and may be used to identify the relevant location in cache 222 where the newly stored authentication information 112 resides. Accordingly, when device 110 and device 120 participate in a subsequent authentication exchange, computing device 110 may send an authentication information retrieval request 312 including the previously generated hash value 322 in lieu of sending its authentication information 112. In response to receiving the hash value 322, device 120 may look in cache 222 to see if any cache entries include the received hash value 322. If a match is found, device 120 may retrieve the authentication information 112 corresponding the matching hash value 322 and begin using the cached authentication information 112. If no match is found, another authentication information exchange 220 may be performed.

In the illustrated embodiment, device 110 may periodically rotate index value 310 to cause a mismatch and subsequent authentication information exchange 220. If a third party is tracking the timing of the current authentication exchange, the party may see the exchange taking longer than an exchange leveraging caching and conclude that device 110 and 120 have not have interacted with one another. In various embodiments, an advantage of using rotating index value 310 is that the sender can control when a subsequent authentication information exchange 220 is triggered for its own authentication information. In contrast, an approach in which, for example, cache 222 is periodically purged, relies on trusting that the recipient actually performs this purge.

Figure 4:
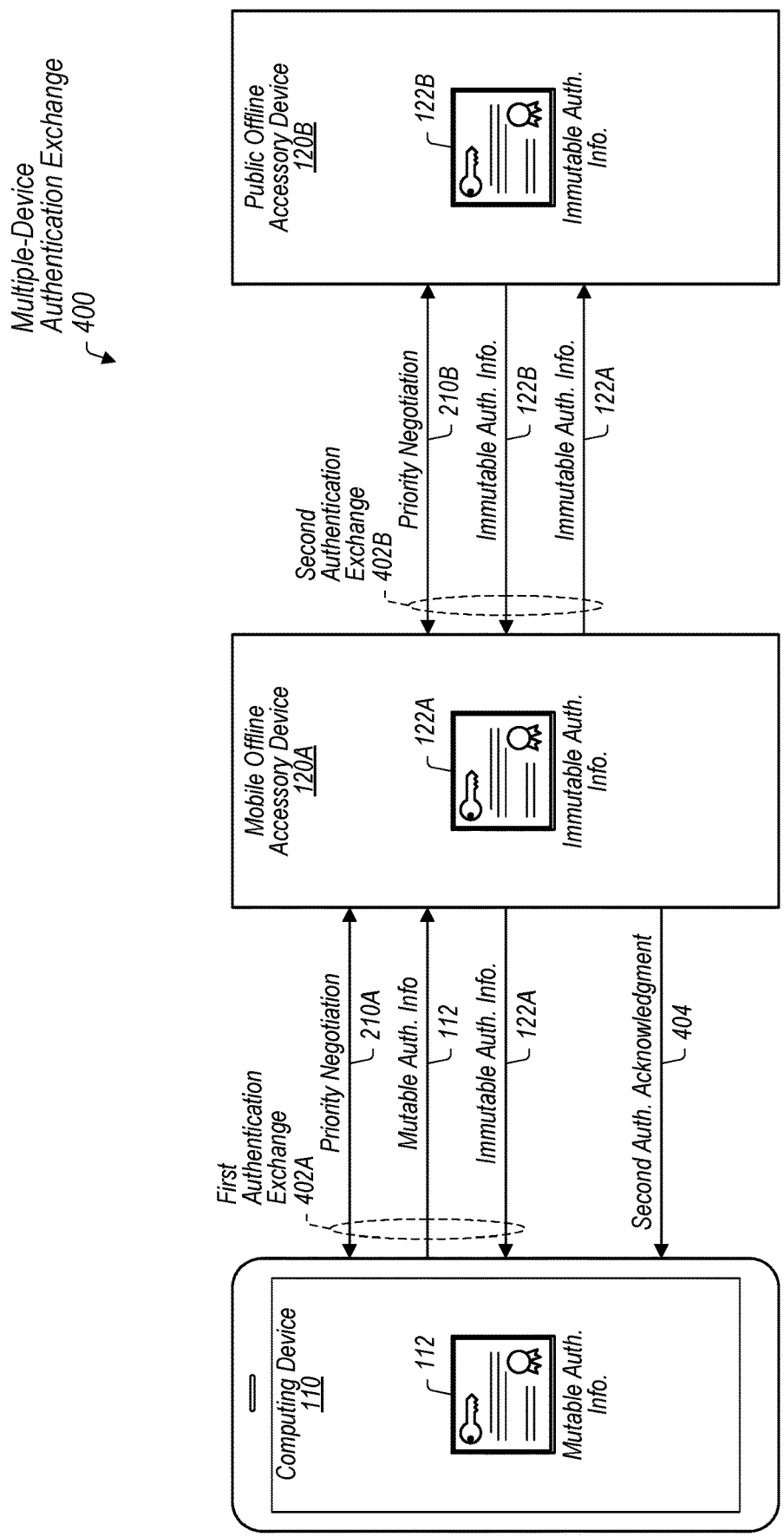
FIG. 4 is a block diagram illustrating an example of an authentication exchange involving multiple devices, in accordance with some embodiments.

Turning now to FIG. 4, a block diagram of a multiple-device authentication exchange 400 is depicted. As noted above, multiple devices 110 and/or 120 may interact with one another to achieve some common goal and may perform multiple authenticate exchanges to mutually authenticate one another. For example, multiple devices 110 may want to authenticate one another to establish a mesh network to facilitate playing a multiplayer game on devices 110. In some embodiments, one participating device may not be able to communicate directly every other participating device and may rely on another participant to serve as a proxy. For example, device 110 may want to send a music stream securely to multiple speaker devices 120, which may include a device 120 that is out of direct wireless range of computing device 110. In the illustrated embodiment, a device 110, a device 120A (e.g., mobile offline accessory device), and a device 120B (e.g., public offline accessory) perform authentication exchange 400 in which devices 120A may act as an intermediary device. In other embodiments, exchange 400 may be implemented differently than shown. For example, exchange 400 may include more devices 110 and/or 120, different combinations of devices 110 and 120 may be used, computing device 110 may interact directly with device 120B, performances of exchanges 402A and 402B may overlap in time, etc.

Authentication exchange 400 may begin as devices 110 and 120 detect one another and initiate communication. In the example depicted in FIG. 4, this may occur first with device 110 and 120A, which may perform a first authentication exchange 402A to mutually authenticate one another. As shown and discussed above with FIG. 2, devices 110 and 120A may perform a first priority negotiation 210A, which may conclude with devices 110 and 120A determining that computing device 110 should go first due to its ability to replace its authentication information 112. In response, computing device 110 may provide its authentication information 112. If accessory device 120A can successfully verify authentication information 112, device 120A may then provide its authentication information 122A. Although not shown, exchange 402A (as well as exchange 402B) may include the additional components discussed above with FIGS. 2A and 2B.

Authentication exchange 400 may continue with device 120A and device 120B performing a second authentication exchange 402B to mutually authenticate one another. As shown, device 120A and device 120B may perform a second priority negotiation 220B to determine an ordering in which authentication information 122A and 122B should be exchanged. In the example depicted in FIG. 4, devices 120A and 120B may determine that device 120B should go first even though it may have an immutable authentication information 122B as it is a "public" device—meaning that it is not tied to any particular person and may interact with multiple devices 110 and 120 belonging to multiple different people. For example, device 120B may be a charging pad provided by a coffee shop to its patrons. Devices 120A and device 120B may determine that device 120A should again go second as it has an immutable authentication information 122A and is mobile, which may potentially allow for user tracking as device 120A moves from one location to another. Accordingly, if mobile device 120A receives authentication information 122B from public device 120B and is unable to verify authentication information 122B, device 120A can withhold its authentication information 122B from device 120B.

Once second authentication exchange 402B successfully completes, device 110 may receive, from accessory device 120A, an acknowledgment 402 indicating that device 120A has performed a second mutual authentication with device 120B. Although acknowledgment 402 may include any suitable metadata about the second exchange 402B, in some embodiments, acknowledgment may include the authentication information 122B of device 120B, which, in some embodiments, may be used to establish a shared cryptographic key between computing device 110 and device 120B in order for both devices 110 and 120B to securely communicate with one another via device 120A. In some embodiments, device 110 may also receive some service responsive to second mutual authentication exchange 402B being successful. For example, if device 120A is a battery supporting wireless charging and device 120B is a wireless charging pad, device 120B may begin charging device 120A, which, in turn, may be begin charging computing device 110. In such an example, authentication exchange 400 may be performed to ensure that device 120B can deliver an appropriate amount of power to device 120A, which, in turn, can enable device 120A to deliver an appropriate amount of power to computing device 110.

Figure 5A:
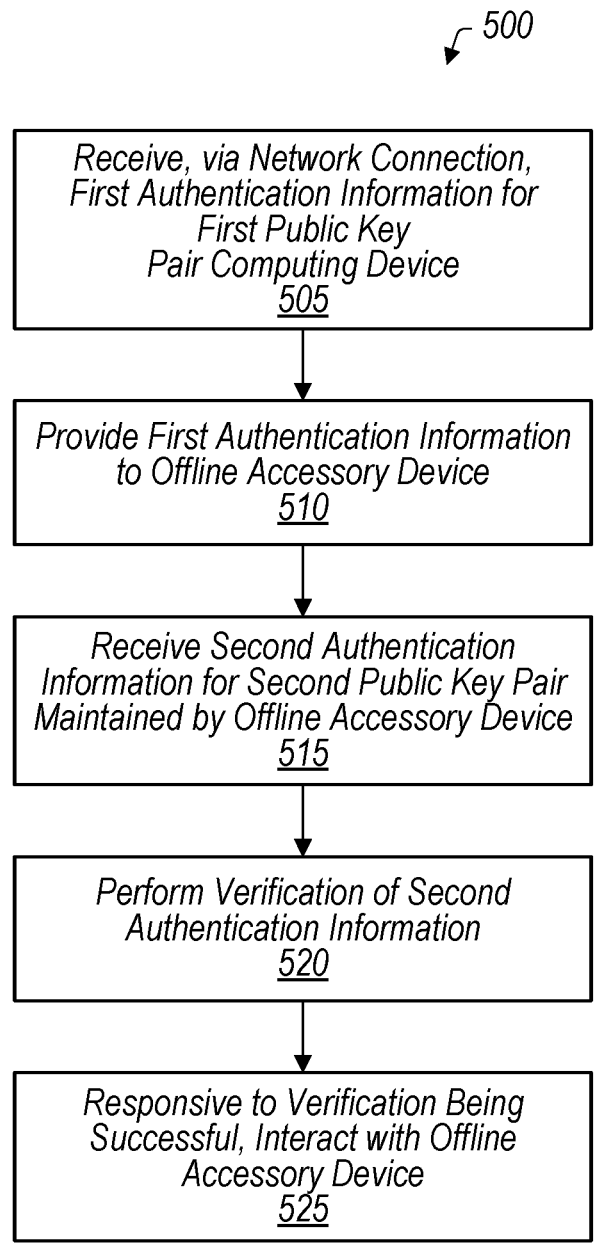
FIGS. 5A and 5B are flow diagrams of methods, in accordance with some embodiments.

Turning now to FIG. 5A, a flow diagram of a method 500 is depicted. Method 500 is one embodiment of a method performed by a first computing device, such as device 110, communicating with an accessory device. In some instances, performance of method 500 may provide a better way to authenticate while preserving privacy.

In step 505, a first device (e.g., device 110 shown in FIGS. 1A and 1B) receives, via a network connection with a network, first authentication information (e.g., information 112 shown in FIG. 1A). In some embodiments, the first authentication information is a first certificate for a first public key pair (e.g., public key pair 114) of the first device. In some embodiments, the first device is a computing device.

In step 510, the first device provides the first authentication information to a second device (e.g., device 120 shown in FIGS. 1A and B). In some embodiments, the second device is an accessory device (e.g., offline accessory device). In some embodiments, prior to providing the first authentication information, the first device determines an ordering in which the first authentication information and second authentication information are to be exchanged by the first device and the second device, and the first authentication information is provided to the second device in accordance with the determined ordering. In some embodiments, the first device sends, to the second device, first priority information (e.g., priority information 212A) indicative of an ordering in which the first device should send the first authentication information and receives, from the second device, second priority information (e.g., priority information 212B) indicative of an ordering in which the second device should send the second authentication information. In such an embodiment, the determined ordering is determined based on the first and second priority information. In some embodiments, the first priority information indicates an ability to interface with a trusted authority system (e.g., system 130) to replace the first authentication information, and the second priority information indicates an inability to interface with a trusted authority system to replace the second authentication information.

In step 515, the first device receives a second authentication information (e.g., information 122) for a second public key pair (e.g., public key pair 124) maintained by the second device.

In step 520, the first device performs a verification of the second authentication information.

In step 525, responsive to the verification being successful, the first device interacts (e.g., interaction 102) with the second device. In some embodiments, the first device performs a mutual authentication with the second device based on the first and second authentication information, and the interacting includes receiving a service from the second device responsive to the mutual authentication being successful. In some embodiments, the first device establishes a shared cryptographic key based on the first and second public key pairs and communicates messages encrypted using the shared cryptographic key. In some embodiments, the first device receives, from the second device, an indication (e.g., second authentication acknowledgment 402) that the second device has performed a second mutual authentication with a third device using the second authentication information, and the service is received responsive to the second mutual authentication.

In various embodiments, method 500 further includes, subsequent to the interacting, determining to replace the first authentication information. In response to the determining, the first device generates a replacement public key pair, issues, to a trusted authority system (e.g., system 130), a signing request (e.g., request 202) for the replacement public key pair and receives, from the authority system, a replacement authentication information for the replacement public key pair. In some embodiments, the first device stores a private key (e.g., request signing key 204) provisioned at fabrication of the first device and signs the signing request with the provisioned private key.

In some embodiments, method 500 further includes providing an index value (e.g. rotating index value 310) with the first authentication information to the second device. In such an embodiment, the second device stores the first authentication information in a cache (e.g., cache 222) at a location identifiable using the index value. During a subsequent communication session, the first device provides information indicative (e.g., hash value 322) of the index value in lieu of providing the first authentication information to cause the second device to retrieve the stored first authentication information from the cache. After the subsequent communication session, the first device replaces the index value to require the second device to discontinue use of the first authentication information stored in the cache.

Figure 5B:
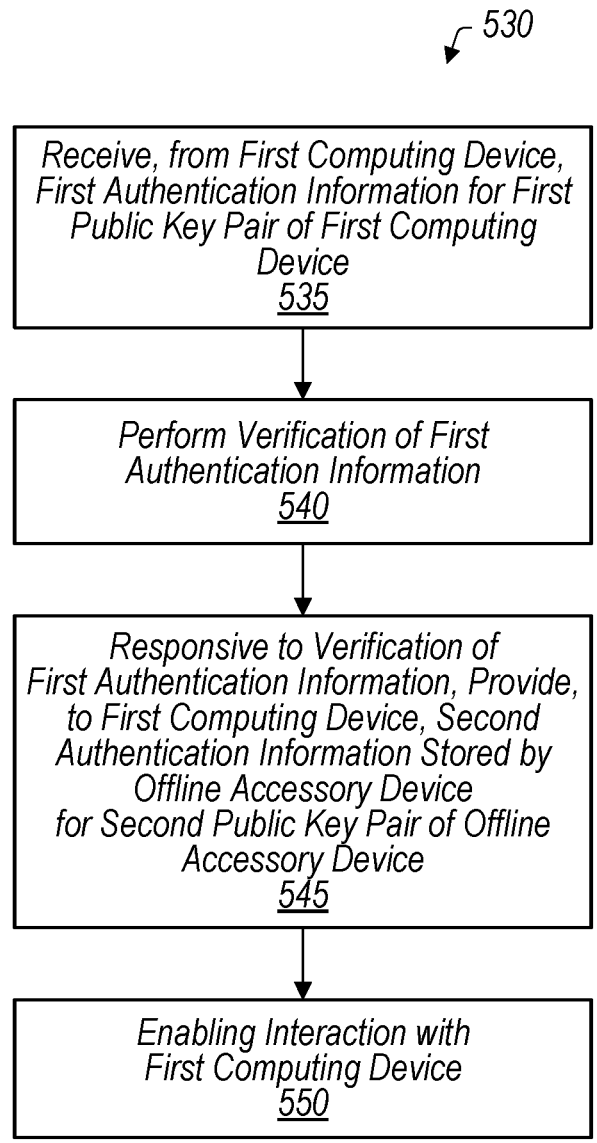

Turning now to FIG. 5B, a flow diagram of a method 530 is depicted. Method 530 is one embodiment of a method performed by an offline accessory device, such as accessory device 120, communicating with a first computing device. In some instances, performance of method 530 may provide a better way to authenticate while preserving privacy.

In step 535, an offline accessory device receives first authentication information (e.g., information 112) from a first computing device (e.g., device 110). In various embodiments, the first authentication information is for a first public key pair (e.g., public key pair 114) of the first computing device. In some embodiments, the offline accessory device detects the first computing device via a network interface and, in response to the detecting, determines to delay providing the second authentication information until after the first authentication information has been received and verified. In some embodiments, the offline accessory device negotiates with the first computing device (e.g., via priority negotiation 210) an ordering in which the first and second authentication information are to be exchanged. In some embodiments, the offline accessory device provides, to the first computing device, an indication (e.g., priority information 212B) that the offline accessory device is unable to communicate with a trusted authority system that issued the second authentication information. In some embodiments, the first and second authentication information are public key certificates issued by a trusted certificate authority (CA).

In step 540, the offline accessory device performs a verification of the first authentication information.

In step 545, responsive to the verification of the first authentication information, the offline accessory device provides a second authentication information (e.g., information 122) stored by the offline accessory device to the first computing device. In various embodiments, the second authentication information is for a second public key pair (e.g., public key pair 124) for the offline accessory device. In some embodiments, the offline accessory device determines, responsive to the verification of the first authentication information being unsuccessful, to not provide the second authentication information to the first computing device.

In step 550, the offline accessory device enables interaction (e.g., interaction 102) with the first computing device. In various embodiments, the offline accessory device performs a first mutual authentication with the first computing device based on the first and second authentication information and enables the interaction in response to the first mutual authentication being successful. In some embodiments, the offline accessory device establishes a shared cryptographic key based on the first and second public key pairs and encrypts the interaction with the first computing device using the shared cryptographic key.

In some embodiments, method 530 further includes the offline accessory device performing a second mutual authentication (e.g., second authentication exchange 402B) with a second computing device (e.g., public offline accessory device 120B) based on the second authentication information and a third authentication information (e.g., information 122B) received from the second computing device. In response to the second mutual authentication being successful, the offline accessory device provides a service to the first computing device. In some embodiments, the offline accessory device negotiates with the second computing device to determine an ordering in which the offline accessory device provides the second authentication information and the second computing device provides the third authentication information.

In some embodiments, method 530 further includes the offline accessory device receiving an index value (e.g., rotating index value 310) with the first authentication information from the first computing device and stores the first authentication information in a cache (e.g., cache 222) based on the index value. During a subsequent communication session, the offline accessory device receives information (e.g., hash value 322) indicative of the index value in lieu of the first authentication information and locates the first authentication information in the cache based on the received information.

Exemplary Computer System

Figure 6:
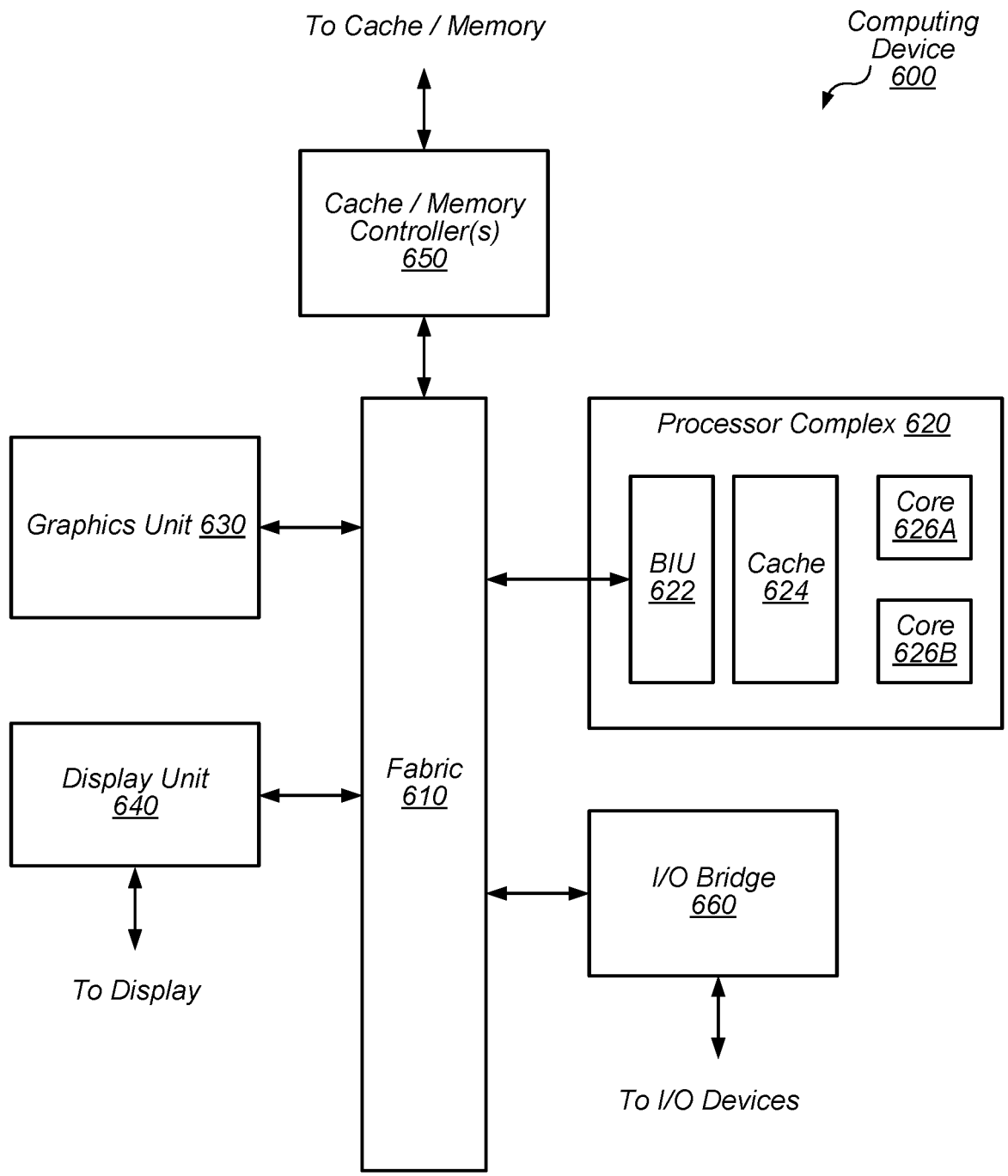
FIG. 6 is a block diagram illustrating one embodiment of an exemplary computer system, in accordance with some embodiments.

Turning now to FIG. 6, a block diagram illustrating an exemplary embodiment of a computing device 600, which may implement functionality of computing device 110, accessory device 120, or trusted certificate authority 130, is shown. Device 600 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, etc. In the illustrated embodiment, device 600 includes fabric 610, processor complex 620, graphics unit 630, display unit 640, cache/memory controller 650, input/output (I/O) bridge 660. In some embodiments, elements of device 600 may be included within a system on a chip (SOC).

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally. As used herein, the term "coupled to" may indicate one or more connections between elements, and a coupling may include intervening elements. For example, in FIG. 6, graphics unit 630 may be described as "coupled to" a memory through fabric 610 and cache/memory controller 650. In contrast, in the illustrated embodiment of FIG. 6, graphics unit 630 is "directly coupled" to fabric 610 because there are no intervening elements.

In the illustrated embodiment, processor complex 620 includes bus interface unit (BIU) 622, cache 624, and cores 626A and 626B. In various embodiments, processor complex 620 may include various numbers of processors, processor cores and/or caches. For example, processor complex 620 may include 1, 2, or 4 processor cores, or any other suitable number. In one embodiment, cache 624 is a set associative L2 cache. In some embodiments, cores 626A and/or 626B may include internal instruction and/or data caches. In some embodiments, a coherency unit (not shown) in fabric 610, cache 624, or elsewhere in device 600 may be configured to maintain coherency between various caches of device 600. BIU 622 may be configured to manage communication between processor complex 620 and other elements of device 600. Processor cores such as cores 626 may be configured to execute instructions of a particular instruction set architecture (ISA), which may include operating system instructions and user application instructions. These instructions may be stored in computer readable medium such as a memory coupled to memory controller 650 discussed below.

Graphics unit 630 may include one or more processors and/or one or more graphics processing units (GPU's). Graphics unit 630 may receive graphics-oriented instructions, such as OPENGL®, Metal, or DIRECT3D® instructions, for example. Graphics unit 630 may execute specialized GPU instructions or perform other operations based on the received graphics-oriented instructions. Graphics unit 630 may generally be configured to process large blocks of data in parallel and may build images in a frame buffer for output to a display. Graphics unit 630 may include transform, lighting, triangle, and/or rendering engines in one or more graphics processing pipelines. Graphics unit 630 may output pixel information for display images.

Display unit 640 may be configured to read data from a frame buffer and provide a stream of pixel values for display. Display unit 640 may be configured as a display pipeline in some embodiments. Additionally, display unit 640 may be configured to blend multiple frames to produce an output frame. Further, display unit 640 may include one or more interfaces (e.g., MIPI® or embedded display port (eDP)) for coupling to a user display (e.g., a touchscreen or an external display).

Cache/memory controller 650 may be configured to manage transfer of data between fabric 610 and one or more caches and/or memories. For example, cache/memory controller 650 may be coupled to an L3 cache, which may in turn be coupled to a system memory. In other embodiments, cache/memory controller 650 may be directly coupled to a memory. In some embodiments, cache/memory controller 650 may include one or more internal caches. Memory coupled to controller 650 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 650 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 620 to cause device 600 to perform functionality described herein such as functionality described with respect to computing device 110, accessory device 120, or trusted authority system 130.

I/O bridge 660 may include various elements configured to implement universal serial bus (USB) communications, security, audio, and/or low-power always-on functionality, for example. I/O bridge 660 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 660. For example, these devices may include various types of wireless communication (e.g., Wi-Fi®, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]— is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

What is claimed is:

1. A non-transitory computer readable medium having program instructions stored therein that are executable by a first computing device to cause the first computing device to perform operations comprising:
   receiving, via a network connection with a network, a first certificate for a first public key pair of the first computing device;
   determining an ordering in which the first certificate and a second certificate are to be exchanged by the first computing device and an offline accessory device;
   after the determining, providing the first certificate to the offline accessory device, wherein the first certificate is provided to the offline accessory device in accordance with the determined ordering;
   receiving the second certificate for a second public key pair maintained by the offline accessory device;
   performing a verification of the second certificate; and
   responsive to the verification being successful, interacting with the offline accessory device.

2. The computer readable medium of claim 1, wherein determining the ordering includes:
   sending, to the offline accessory device, first priority information indicative of an ordering in which the first computing device sends the first certificate; and receiving, from the offline accessory device, second priority information indicative of an ordering in which the offline accessory device sends the second certificate; and wherein the determined ordering is determined based on the first and second priority information.

3. The computer readable medium of claim 2, wherein the first priority information indicates an ability to interface with a certificate authority to replace the first certificate, and wherein the second priority information indicates an inability to interface with a certificate authority to replace the second certificate.

4. The computer readable medium of claim 1, wherein the operations further comprise:

performing a mutual authentication with the offline accessory device based on the first and second certificates; and wherein the interacting includes receiving a service from the offline accessory device responsive to the mutual authentication being successful.

5. The computer readable medium of claim 4, wherein the operations further comprise:

establishing a shared cryptographic key based on the first and second public key pairs; and communicating messages encrypted using the shared cryptographic key.

6. The computer readable medium of claim 4, wherein the operations further comprise:

receiving, from the offline accessory device, an indication that the offline accessory device has performed a second mutual authentication with a second device using the second certificate, wherein the service is received responsive to the second mutual authentication.

7. The computer readable medium of claim 1, wherein the operations further comprise:

subsequent to the interacting, determining to replace the first certificate;

in response to the determining:

generating a replacement public key pair;

issuing, to a certificate authority, a certificate signing request for the replacement public key pair; and receiving, from the certificate authority, a replacement certificate for the replacement public key pair.

8. The computer readable medium of claim 7, wherein the operations further comprise:

storing a private key provisioned at fabrication of the first computing device; and signing the certificate signing request with the provisioned private key.

9. The computer readable medium of claim 1, wherein the operations further comprise:

providing an index value with the first certificate to the offline accessory device, wherein the offline accessory device stores the first certificate in a cache at a location identifiable using the index value;

during a subsequent communication session, providing information indicative of the index value in lieu of providing the first certificate to cause the offline accessory device to retrieve the stored first certificate from the cache; and after the subsequent communication session, replacing the index value to require the offline accessory device to discontinue use of the first certificate stored in the cache.

10. A computing device, comprising:

one or more processors; and a memory having program instructions stored therein that are executable by the one or more processors to cause the computing device to perform operations including:

receiving, via a network connection with a network, a first certificate for a first public key pair of the computing device;

determining, by the computing device, an ordering in which the computing device and an offline accessory device are to authenticate;

after the determining, providing the first certificate to the offline accessory device, wherein the first certificate is provided to the offline accessory device in accordance with the determined ordering;

receiving a second certificate for a second public key pair maintained by the offline accessory device;

performing a verification of the second certificate; and responsive to the verification being successful, interacting with the offline accessory device.

11. The computing device of claim 10, wherein the determining includes:

exchanging priority information indicative of an ordering in which the first and second certificates are to be exchanged by the computing device and the offline accessory device.

12. The computing device of claim 11, wherein the priority information indicates an ability to interface with a certificate authority to replace a certificate.

13. The computing device of claim 10, wherein the operations further comprise:

providing an index value with the first certificate to the offline accessory device, wherein the offline accessory device stores the first certificate in a cache at a location identifiable using the index value; and during a subsequent communication session, providing information indicative of the index value in lieu of providing the first certificate to cause the offline accessory device to retrieve the stored first certificate from the cache.

14. The computing device of claim 13, wherein the operations further comprise:

after the subsequent communication session, replacing the index value to require the offline accessory device to discontinue use of the first certificate stored in the cache.

15. A method comprising:

receiving, by a computing device via a network connection with a network, a first certificate for a first public key pair of the computing device;

determining, by the computing device, an ordering in which the computing device and an offline accessory device are to authenticate;

after the determining, providing, by the computing device, the first certificate to the offline accessory device, wherein the first certificate is provided to the offline accessory device in accordance with the determined ordering;

receiving, by the computing device, a second certificate for a second public key pair maintained by the offline accessory device;

performing, by the computing device, a verification of the second certificate; and responsive to the verification being successful, the computing device interacting with the offline accessory device.

16. The method of claim 15, wherein determining the ordering includes:

sending, to the offline accessory device, information indicating an ability to interface with a certificate authority to replace the first certificate.

17. The method of claim 15, further comprising:

establishing a shared cryptographic key based on first and second public key pairs associated with the first and second certificates; and communicating messages encrypted using the shared cryptographic key.

18. The method of claim 15, further comprising:

providing an index value with the first certificate to the offline accessory device, wherein the offline accessory device stores the first certificate in a cache at a location identifiable using the index value;

during a subsequent communication session, providing information indicative of the index value in lieu of providing the first certificate to cause the offline accessory device to retrieve the stored first certificate from the cache; and after the subsequent communication session, replacing the index value to require the offline accessory device to discontinue use of the first certificate stored in the cache.

\* \* \* \* \*